A. E. WHITE.
SAW SHAPER.
APPLICATION FILED AUG. 10, 1908.

956,915.

Patented May 3, 1910.
2 SHEETS—SHEET 1.

WITNESSES

INVENTOR
ALBERT E. WHITE
BY Paul & Paul
HIS ATTORNEYS

A. E. WHITE.
SAW SHAPER.
APPLICATION FILED AUG. 10, 1908.
956,915.
Patented May 3, 1910.
2 SHEETS—SHEET 2.
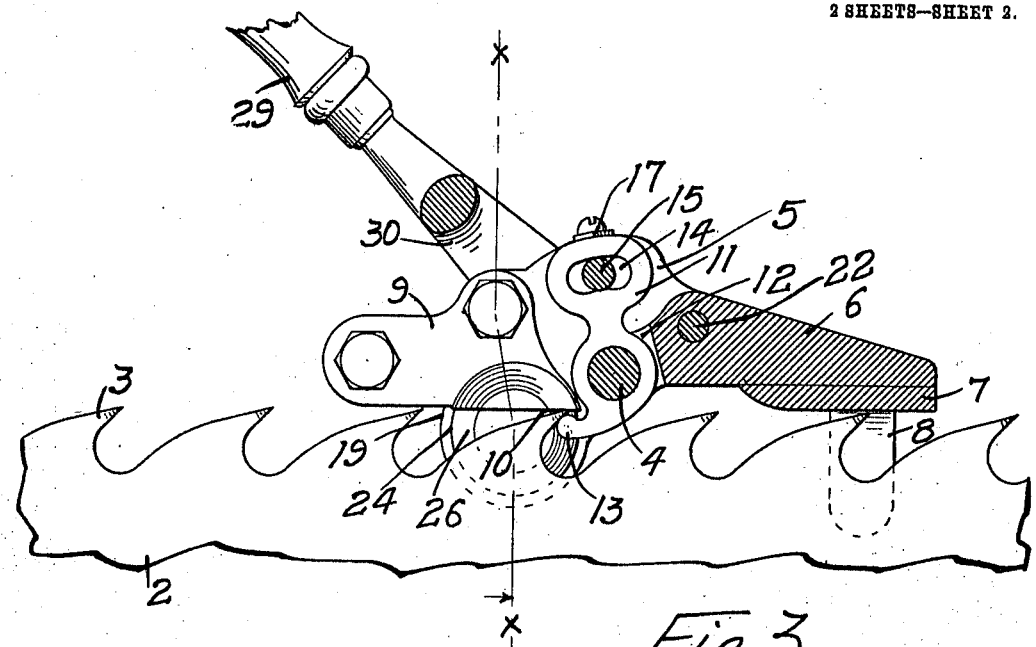
Fig 3.
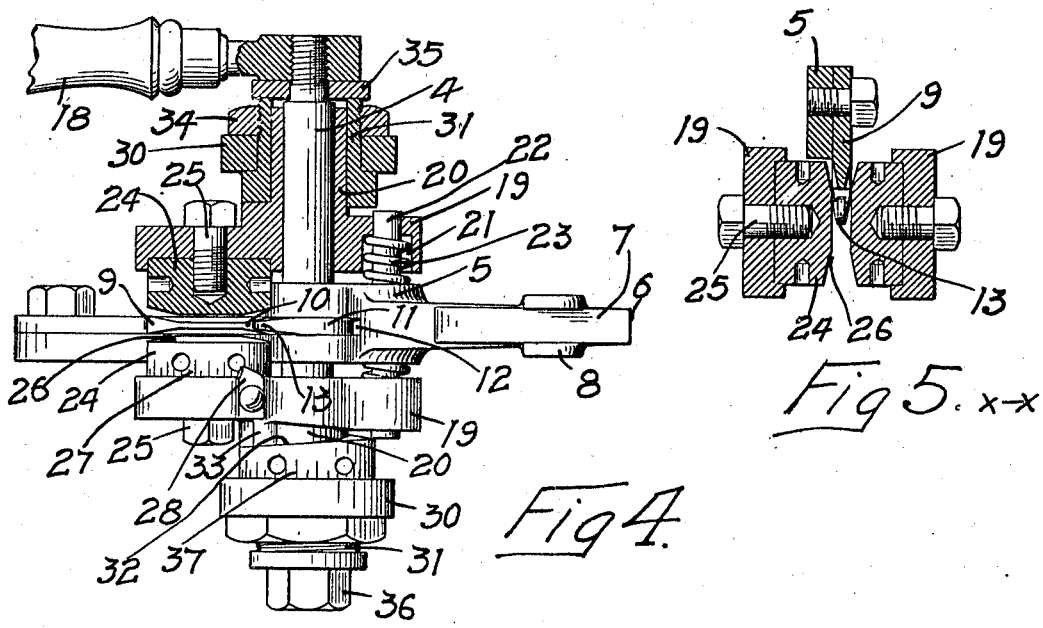
Fig 4.
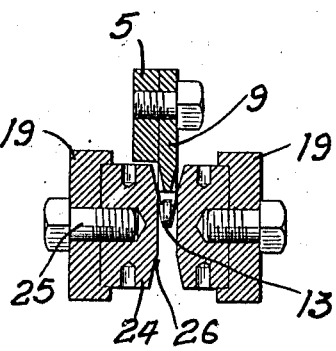
Fig 5. x-x
WITNESSES
INVENTOR
ALBERT E. WHITE
BY Paul & Paul
HIS ATTORNEYS

UNITED STATES PATENT OFFICE.

ALBERT E. WHITE, OF EAU CLAIRE, WISCONSIN.

SAW-SHAPER.

956,915.  Specification of Letters Patent.  Patented May 3, 1910.

Application filed August 10, 1908. Serial No. 447,683.

*To all whom it may concern:*

Be it known that I, ALBERT E. WHITE, of Eau Claire, Eau Claire county, Wisconsin, have invented certain new and useful Improvements in Saw-Shapers, of which the following is a specification.

My invention relates to devices for shaping the teeth of band, gang and circular saws, and the object of the invention is to provide a tool of simple construction, one that can be easily operated, and is very effective for the purpose designed.

The invention consists generally in various constructions and combinations, all as hereinafter described, and particularly pointed out in the claims.

Figure 1:
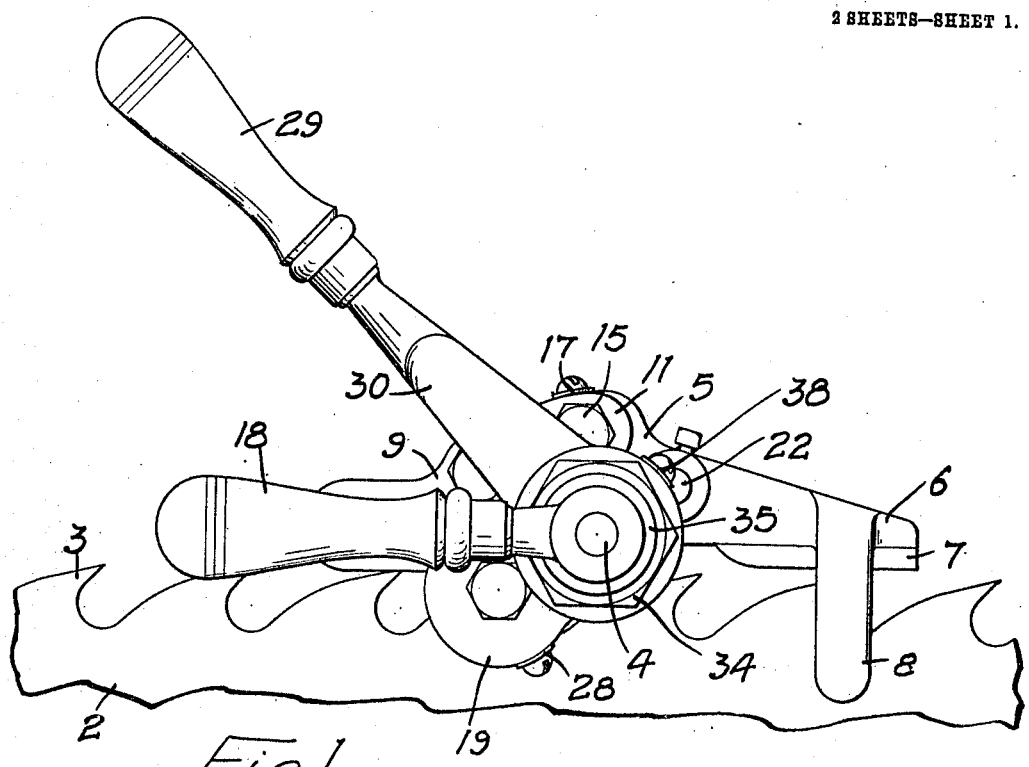
Figure 2:
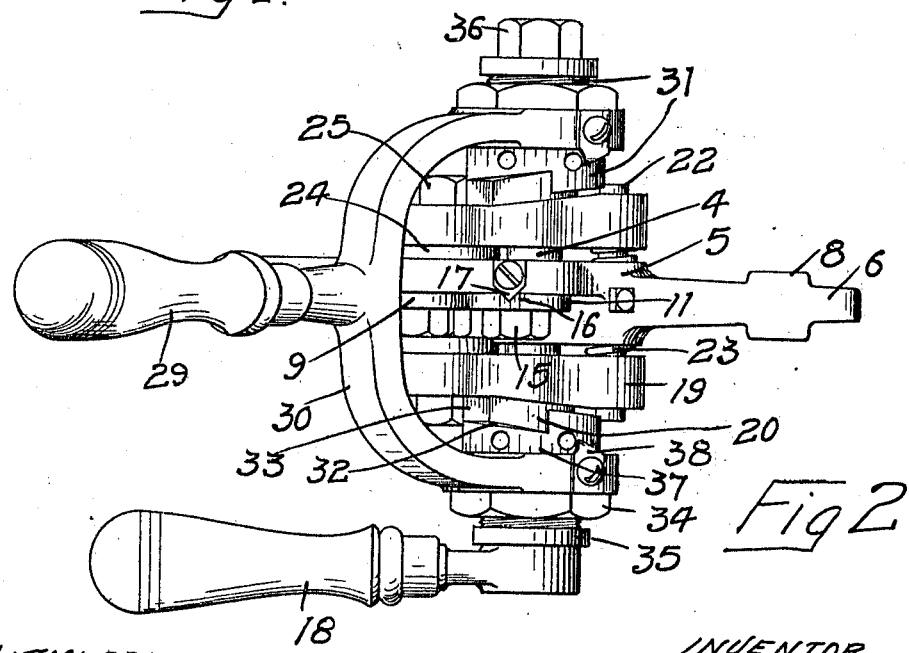

In the accompanying drawings forming part of this specification, Figure 1, is a side elevation of a shaping tool embodying my invention, Fig. 2, is a top view of the same, Fig. 3, is a sectional view showing the device in use and the anvil in contact with the saw tooth, Fig. 4, illustrates the operation of the dies between which the saw teeth are clamped during the shaping operation. Fig. 5, is a detailed sectional view on the line x—x of Fig. 3.

In the drawing, 2 represents a portion of a saw having teeth 3. 4 is a shaft and 5 a frame mounted thereon and having a forwardly extending bracket 6 carrying a plate 7 and depending arms 8 which straddle the saw teeth. On the other side of the shaft, the frame 5 is provided with an anvil 9 having an edge 10 that is adapted to contact with the point of the tooth in the operation of the tool. A plate 11 is mounted on the shaft 4 within a slot 12 in said frame, and has a curved lower end 13 that is adapted to form a stop between which and the anvil, the tooth point is held. This stop does not contact with the extreme point of the tooth, and an opening is formed between the anvil and the stop, so that in case the points of the teeth vary in length, as they are very likely to after swaging, the work of the machine will be effected, but all the teeth will be shaped so that when ground, they will be of uniform width. They will also correspond in shape regardless of their length before the shaping operation. Plate 11 has a slot 14 therein to receive a bolt 15 which when loosened, allows the oscillation and adjustment of said plate to alter the position of the stop 13 with respect to the point of the tooth. The end of the plate has a scale 16 thereon and an indicator 17 is mounted on the frame over said scale and whereby the operator can determine the exact adjustment of the stop.

The anvil covers the entire point of the tooth, and fills the whole space between the shaper dies and prevents the tooth from bulging upwardly and insures a smooth uniform surface on the back of the tooth as it is shaped. The brackets or ends of the frame extending in the front and rear of the tooth that is being shaped, hold the machine firmly in place during the shaping operation and on one end of the shaft 4, I provide a lever 18 to be grasped by the operator for the purpose of holding the tool securely. Upon each side of the frame, I provide plates 19 having hubs 20, slidable on said shaft, and sockets 21 to receive the ends of a guiding pin 22 that is mounted in the frame 6. Springs 23 interposed between the said frame and the plates 19 on said pin, tend to hold the said plates apart with a yielding pressure. Upon the other side of the shaft, circular dies 24 are mounted in said plates on bolts 25. These dies are opposite one another and have convex bearing faces 26 between which each tooth is clamped and rigidly held and the bent portions of the teeth straightened during the shaping operation of the point and thus a perfect alinement of the points when the operation is completed, is insured. These circular dies have graduated peripheries 27 and indicators 28 above said graduations and upon loosening the bolts 25, the dies may be rotated to present new surfaces when any working point becomes worn, the graduations allowing the operator to adjust the dies to the same relative position. An operating lever 29 has a fork 30 that is journaled on sleeves 31 that are mounted on the hubs 20 of the plates 19. The inner ends of the sleeves 31 have cam surfaces 32 thereon, which engage shoulders 33 formed on the plates 19. The outer ends of the sleeves 31 are exteriorly threaded and provided with nuts 34 which hold the ends of the fork 30 in place on said sleeves. By loosening these nuts, the sleeves may be revolved for the purpose of changing the position of the cam surfaces thereon with respect to the shoulders 33. Both ends of the shaft 4, have a washer 35 contacting with the outer ends of the sleeves 31, said washers being held in place by the lever 18 and a nut 36 which have preferably a threaded connection with the end of said shaft. Suitable graduations 37 are provided on the sleeves 31 and indicators 38 are mounted on the fork 30 to enable the operator to adjust the cam surface correspondingly and insure a uniform movement of the circular dies. The movement of the operating lever 29 is forward and the pressure of the anvil on the tooth has a rolling action thereon to pull the point of the tooth in the direction of movement of the lever. This tipping forward of the tooth point, causes light grinding on the face of the point, and heavier grinding on the back of the tooth. This is a necessary condition in order to maintain the shape when a tooth with a considerable degree of hook thereon is being used.

With this tool, it is possible to shape the point of the tooth as desired, rolling it forward and making the points of the teeth of uniform width and shape. The rotary adjustment of the dies lengthens their life to a considerable degree and insures uniform working surfaces and perfect alinement of the teeth points. The cam surfaces for operating the shaper dies, I have found to be a great improvement over the screw movement generally used, as it is capable of adjustment to vary the degree of movement of the dies toward one another, and the pressure exerted for a given movement of the operating lever and more accurate and satisfactory results can be obtained than by the use of the ordinary screw mechanism. Adjustment of the stop plate adapts the tool for any style or shape of tooth, such adjustment being made independently of the shaper dies and the anvil.

To use the tool, the shaper is placed over the teeth of a saw and held by means of the lever 18. The anvil and the stop plate are adjusted so that a tooth will be engaged between them, as indicated in Fig. 3. Then by the movement of the lever 29, the sides of the tooth will be gripped by the dies and the pressure forward will exert a rolling action on the point of the tooth, as it is held between the anvil and the curved end 13 of the stop plate. Any teeth that are bent or twisted will be straightened and the desired shape obtained.

I claim as my invention:

1. In a saw shaper, an anvil adapted to rest on the teeth and bear on the point of the tooth that is being shaped on the upper side thereof with a rolling pressure, in combination, with a stop plate having a part extending under the tooth and bearing only on the under side thereof below and out of contact with its point.

2. In a saw shaper, a stationary anvil adapted to rest on the teeth and bear on the point of a tooth that is being shaped with a rolling pressure, in combination with a stop plate having a part to extend in under the point where the anvil contacts with a tooth and engage the tooth that is being shaped below and out of contact with the point thereof, and said stop plate being adjustable to vary the point of engagement of said part with the tooth.

3. In a saw shaper, an anvil adapted to rest on the teeth and bear on the point of a tooth that is being shaped with a rolling pressure, a shaft, a stop plate having a rocking movement thereon and provided with a part adapted to extend in under the anvil and the under side only of the tooth that is being shaped and engage the edge of the tooth below the point thereof, and means whereby said plate is rendered adjustable on said shaft.

4. In a saw shaper, an anvil adapted to rest on the tip of the teeth to be shaped, a shaft, a plate mounted thereon and having a part to engage the edge of a tooth below said anvil and said plate having a transverse slot therein and a bolt passing through said slot and whereby said plate has a limited oscillating adjustment, substantially as described.

5. In a saw shaper, an anvil adapted to rest on the teeth and bear on the point of a tooth that is being shaped with a rolling pressure, a stop plate having a part to engage the edge of a tooth below and independent of said anvil and said stop plate having an opening between which and said anvil the point of the tooth is inserted, and said plate projecting on the under side only of a tooth and contacting therewith beneath the point where the anvil bears on the upper side of the tooth.

6. A saw shaper comprising a frame having forwardly and rearwardly extending brackets, a stationary anvil carried by said rearwardly extending bracket and having a substantially straight lower edge adapted to rest upon the tops of the teeth and exert a rolling action thereon, a stop plate mounted in said frame and having a part adapted to extend in under a tooth and bear only on its lower edge beneath the point where said anvil contacts with the tooth, and means for oscillating said frame to impart a forward rocking movement to said anvil and stop plate.

7. In a saw shaper, dies adapted to move toward and from one another and between which a tooth is gripped and straightened, said dies being capable of a step by step rotary adjustment of any number of degrees in their bearings to present new surfaces to the work.

8. In a saw shaper, an anvil having a part to bear on the point of a tooth that is being shaped on the upper side thereof with a rolling pressure, and a stop plate having a part extending under the tooth and bearing on the underside thereof, below the point and out of contact therewith, said plate having a transverse slot therein and a locking bolt passing therethrough, substantially as described.

9. In a saw shaper, dies and means supporting them on each side of a saw tooth and cam devices for operating said dies, said cam devices including sleeves having cam surfaces, and plates interposed between said cam surfaces and said dies and engaged by said sleeves, and having hubs whereon said sleeves are mounted, whereby when said sleeves are rotated said plates and dies will be operated simultaneously.

10. In a saw shaper, a shaft, plates slidably mounted thereon toward and from one another, circular shaper dies carried by said plates and said dies being capable of rotary adjustment to change their working surfaces, substantially as described.

11. In a saw shaper, a shaft, plates slidably mounted thereon a guide pin, a frame therefor, said pin sliding within sockets in said plates, springs carried by said pin between said frame and plates and normally holding said plates in their separated position and shaper dies carried by said plates and between which a tooth is gripped, shaped and straightened.

12. In a saw shaper, a shaft, plates slidably mounted thereon, dies carried by said plates, sleeves surrounding said shaft and having cam surfaces to engage said plates and an operating lever for said sleeves.

13. In a saw shaper, a shaft, plates having hubs slidably mounted on said shaft, sleeves inclosing said hubs and having cam surfaces at their inner ends engaging said plates, stops for said sleeves at the outer ends thereof, a lever having a forked end mounted on said sleeves, and shaper dies carried by said plates and adapted to be moved toward or from each other by the operation of said lever, substantially as described.

14. In a saw shaper, dies between which a tooth is gripped and held, supports for said dies, and hubs on said supports, a shaft whereon said hubs are mounted, cams inclosing said hubs and arranged to revolve thereon and engage said supports to move said dies toward one another, means for rotating said shaft, and means for changing the adjustment of said cams to vary the travel of said dies.

15. In a saw shaper, the combination, with an anvil having an under surface adapted to contact with the point of a tooth, of a stop plate having a curved lower portion that is adapted to extend in under said anvil and engage the tooth below the point thereof whereby a rolling action will be obtained upon the tooth point.

16. In a saw shaper, the combination, with an anvil adapted to rest on the teeth and bear on the point of the tooth that is being shaped with a rolling pressure, of an independent stop plate having a part extending under the tooth only and contacting therewith beneath the point where the anvil rests on the upper side of the tooth, said plate being adjustable to vary its point of contact with the tooth and dies, between which the tooth is gripped.

17. In a saw shaper, a shaft, plates slidably mounted thereon, springs arranged to normally separate said plates, dies carried by said plates and between which the saw teeth are gripped and held, said plates having hubs slidable on said shaft, and sleeves mounted on said hubs and capable of rotating thereon, the inner ends of said sleeves being provided with cam surfaces, and said plates having shoulders in the path of said cam surfaces, and a crank having a forked lower end mounted on said sleeves and adapted to rotate the same and force said dies toward one another, substantially as described.

18. In a saw shaper, a shaft, circular shaper dies, supports slidable on said shaft toward and from one another and on which supports said shaper dies are mounted and capable of rotary adjustment thereon to present new wearing faces to the work, substantially as described.

19. In a saw shaper, the combination, with a frame, a shaft mounted therein, hubs slidably mounted on said shaft, shaper dies carried by said hubs, sleeves inclosing said hubs and having cam faces adapted to move said hubs toward one another, means for yieldingly holding said hubs apart, a lever having a fork mounted on said sleeves and adapted to rotate the same when said lever is oscillated, substantially as described.

20. The combination, with a frame, of a shaft, hubs slidably mounted thereon, shaper dies carried by said hubs, sleeves inclosing said hubs and having cam faces arranged to move said hubs toward one another when said sleeves are rotated, an operating lever for said sleeves, and means for changing the rotary adjustment of said sleeves to vary the travel of said dies toward one another, substantially as described.

21. In a saw shaper, an anvil adapted to rest on the point of a tooth on the upper side thereof, and a vertically arranged stop plate having means at its lower end to extend under the tooth and contact therewith beneath the point of contact with the anvil and between said point of contact and the base of the tooth whereby a rolling action will be exerted on the tooth when the tool is operated.

In witness whereof, I have hereunto set my hand this fourth day of August 1908.

ALBERT E. WHITE.

Witnesses:
C. L. TOLLES,
ROBT. B. BRIGGS.